(12) United States Patent
Chang et al.

(10) Patent No.: US 11,431,864 B1
(45) Date of Patent: Aug. 30, 2022

(54) DUPLEX SCANNING DEVICE

(71) Applicant: KINPO ELECTRONICS, INC., New Taipei (TW)

(72) Inventors: Po-Chih Chang, New Taipei (TW); Sung-Po Lin, New Taipei (TW); Tzu-Cheng Chang, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 0 days.

(21) Appl. No.: 17/405,864

(22) Filed: Aug. 18, 2021

(30) Foreign Application Priority Data

Jul. 7, 2021 (CN) .......................... 202121532112.3

(51) Int. Cl.
*H04N 1/04* (2006.01)
*H04N 1/00* (2006.01)
*H04N 1/10* (2006.01)
*H04N 1/12* (2006.01)

(52) U.S. Cl.
CPC ..... *H04N 1/00572* (2013.01); *H04N 1/00559* (2013.01); *H04N 1/00604* (2013.01); *H04N 1/1061* (2013.01); *H04N 1/121* (2013.01)

(58) Field of Classification Search
None
See application file for complete search history.

(56) References Cited

U.S. PATENT DOCUMENTS

| | | | | |
|---|---|---|---|---|
| 2004/0156662 A1* | 8/2004 | Fujii | .................... | G03G 15/607 399/367 |
| 2004/0207152 A1* | 10/2004 | Watanabe | .............. | B65H 31/10 271/294 |
| 2016/0304304 A1* | 10/2016 | Link | ........................ | B65H 7/06 |

* cited by examiner

*Primary Examiner* — Cheukfan Lee
(74) *Attorney, Agent, or Firm* — Chun-Ming Shih; HDLS IPR Services

(57) ABSTRACT

This disclosure is related to a duplex scanning device. The automatic document feeder includes a paper feeder body, a paper inlet and a paper outlet. The paper cassette includes an upper paper tray and a lower paper tray adjacent to the paper inlet and the paper outlet. The cassette power module includes a motor set and a transmission part. The transmission part drives the paper cassette to move on one side of the automatic document feeder to control the lower paper tray to connect with the paper inlet or the paper outlet. Therefore, the double-sided scanning of the document is completed by two-pass duplex scanning.

10 Claims, 6 Drawing Sheets

DUPLEX SCANNING DEVICE

BACKGROUND

Technical Field

The technical field relates to a multifunctional scanning device, and particularly relates to a duplex scanning device.

Description of Related Art

A flatbed scanner is one of common business equipment in most offices or homes. The purpose of the flatbed scanner is to scan documents or photo images to convert that into electronic data. In addition, the flatbed scanner may be equipped with an automatic document feeder (ADF) to constitute a multifunctional scanning device that may scan a large number of documents and speed up the scanning operation by the automatic document feeder.

Moreover, when the double-sided scanning is performed by the automatic document feeder, one scanning mode is to dispose image sensors on both sides of the paper path to scan the front and back sides of the document respectively. In that scanning mode, the document only needs to pass the paper path one time and the double-sided images are obtained. However, that scanning mode requires two image sensors which need to be cleaned and maintained separately, and that results in a higher overall cost.

Furthermore, another scanning mode is to dispose a single image sensor on the paper path. After scanning the front side of the document, the document is turned over and then fed into the paper path again to scan the back side of the document. When the back side of the document is scanned, the document needs to be turned over and pass the paper path (without scanning) to make the document to turn back to the front side. This scanning mode adopts a single image sensor with a lower overall cost. However, the document has to complete the double-sided scanning by three-pass scanning, and that results in a long scanning time and the scanning efficiency is decreased.

SUMMARY OF THE DISCLOSURE

One object of this disclosure is to provide a duplex scanning device.

In the embodiment of this disclosure, a duplex scanning device includes a flatbed scanner, an automatic document feeder, a paper cassette and a cassette power module. The automatic document feeder is combined on the flatbed scanner. The automatic document feeder includes a paper feeder body, a paper inlet and a paper outlet, and the paper inlet and the paper outlet are located on an upper side and a lower side of the paper feeder body respectively. The paper cassette is disposed on one side of the paper feeder body and adjacent to the paper inlet and the paper outlet. The paper cassette includes an upper paper tray and a lower paper tray arranged spacedly. The cassette power module is disposed on one side of the paper cassette. The cassette power module includes a motor set and a transmission part connected to the motor set, and the transmission part connects with the paper cassette. The transmission part drives the paper cassette to move on one side of the automatic document feeder under a driving of the motor set to control the lower paper tray to connect with the paper inlet or the paper outlet.

One of the exemplary embodiments, the lower paper tray includes a rotating shaft on a side thereof away from the cassette power module, and the rotating shaft is disposed on the flatbed scanner.

One of the exemplary embodiments, the paper cassette further includes a plurality of supporting pillars arranged spacedly on peripheries of the upper paper tray and the lower paper tray, and the supporting pillars are connected to each other in pairs to form a lower paper space between the upper paper tray and the lower paper tray.

One of the exemplary embodiments, the upper paper tray is arranged on a side of the paper cassette away from the flatbed scanner and includes an upper paper space. A fixed paper space is formed between the lower paper tray and the flatbed scanner.

One of the exemplary embodiments, the motor set includes a motor fixing part, a motor body and a driving gear disposed on the motor fixing part, and the driving gear is connected to the motor body and the transmission part.

One of the exemplary embodiments, the transmission part includes a rack, and the motor fixing part includes a rail, and the transmission part moves along the rail and is movably coupled to the motor fixing part.

One of the exemplary embodiments, the cassette power module further includes a supporting plate connected to the motor fixing part and disposed on a bottom side of the lower paper tray.

One of the exemplary embodiments, the motor fixing part includes a housing, and the housing includes a first protruding post on a side thereof facing the paper cassette. The supporting plate includes a first perforation disposed on one end thereof, and the first protruding post is inserted in the first perforation.

One of the exemplary embodiments, the rack includes a coupling post. The supporting plate includes a first sliding groove, and the coupling post is inserted in the first sliding groove.

One of the exemplary embodiments, the cassette power module further includes a supporting seat, and the supporting seat includes a second protruding post. The supporting plate includes a second perforation located on another end thereof corresponding to the first perforation, and the second protruding post is inserted in the second perforation.

One of the exemplary embodiments, the duplex scanning device of this disclosure includes a cassette power module disposed on one side of the automatic document feeder, and the paper cassette is driven by the cassette power module to move beside the automatic document feeder, so as to control the upper paper tray and the lower paper tray to connect with the paper inlet. Therefore, the document may complete the two-sided scanning only by two-pass duplex scanning to improve the scanning efficiency. Additionally, the duplex scanning device includes only one image sensor to scan both sides of the document. Thus, the overall cost of the duplex scanning device may be reduced.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
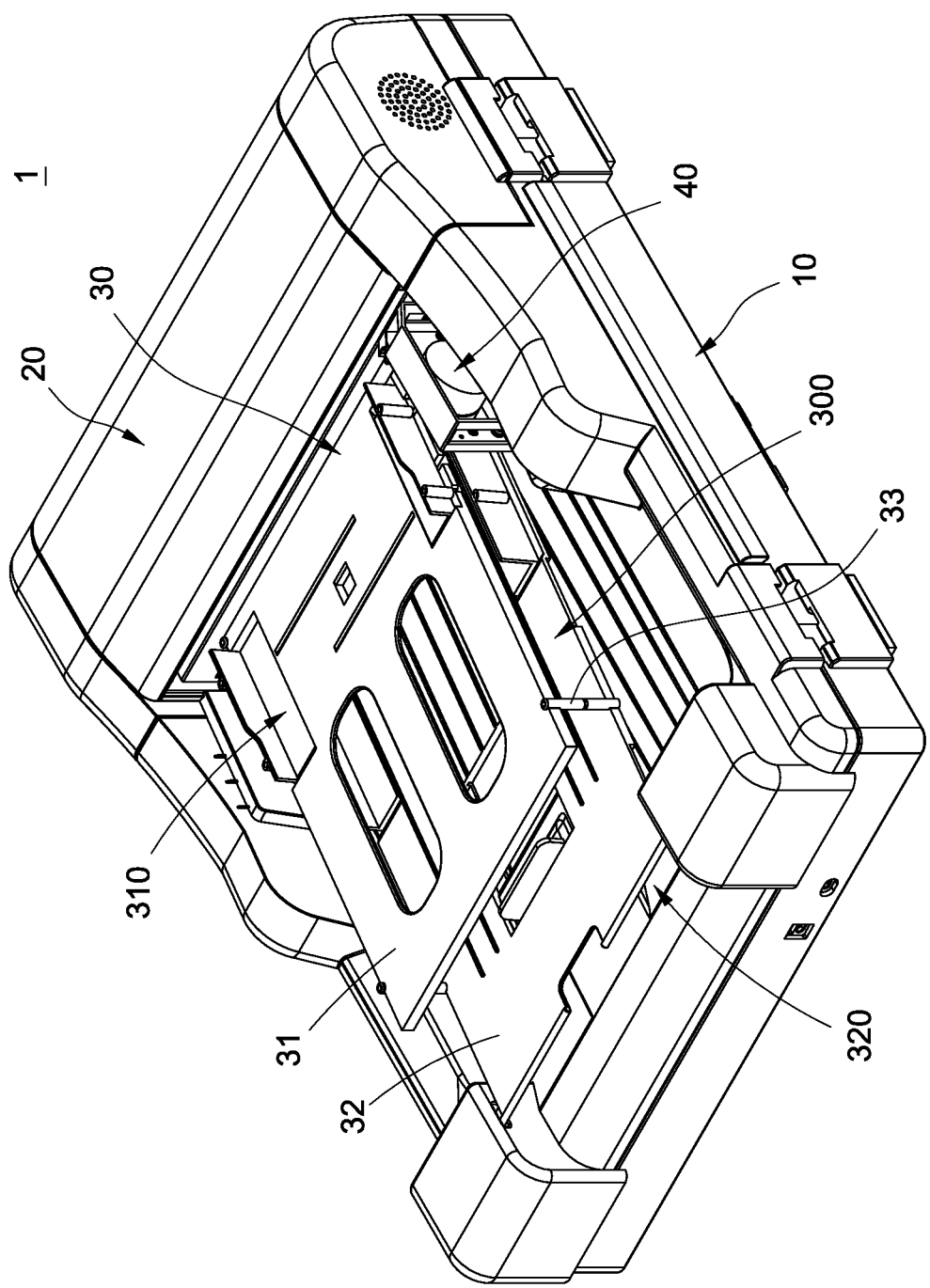
FIG. 1 is a perspective schematic view of the duplex scanning device of this disclosure.

Please refer to FIG. 1, it depicts a perspective schematic view of the duplex scanning device of this disclosure. A duplex scanning device 1 of this disclosure includes a flatbed scanner 10, an automatic document feeder 20, a paper cassette 30 and a cassette power module 40. The automatic document feeder 20 is combined on the flatbed scanner 10. The paper cassette 30 is disposed on one side of the automatic document feeder 20. The cassette power module 40 drives the paper cassette 30 to move on one side of the automatic document feeder 20, so as to change the paper feed position. More detailed of the duplex scanning device 1 is described as follows.

Figure 2:
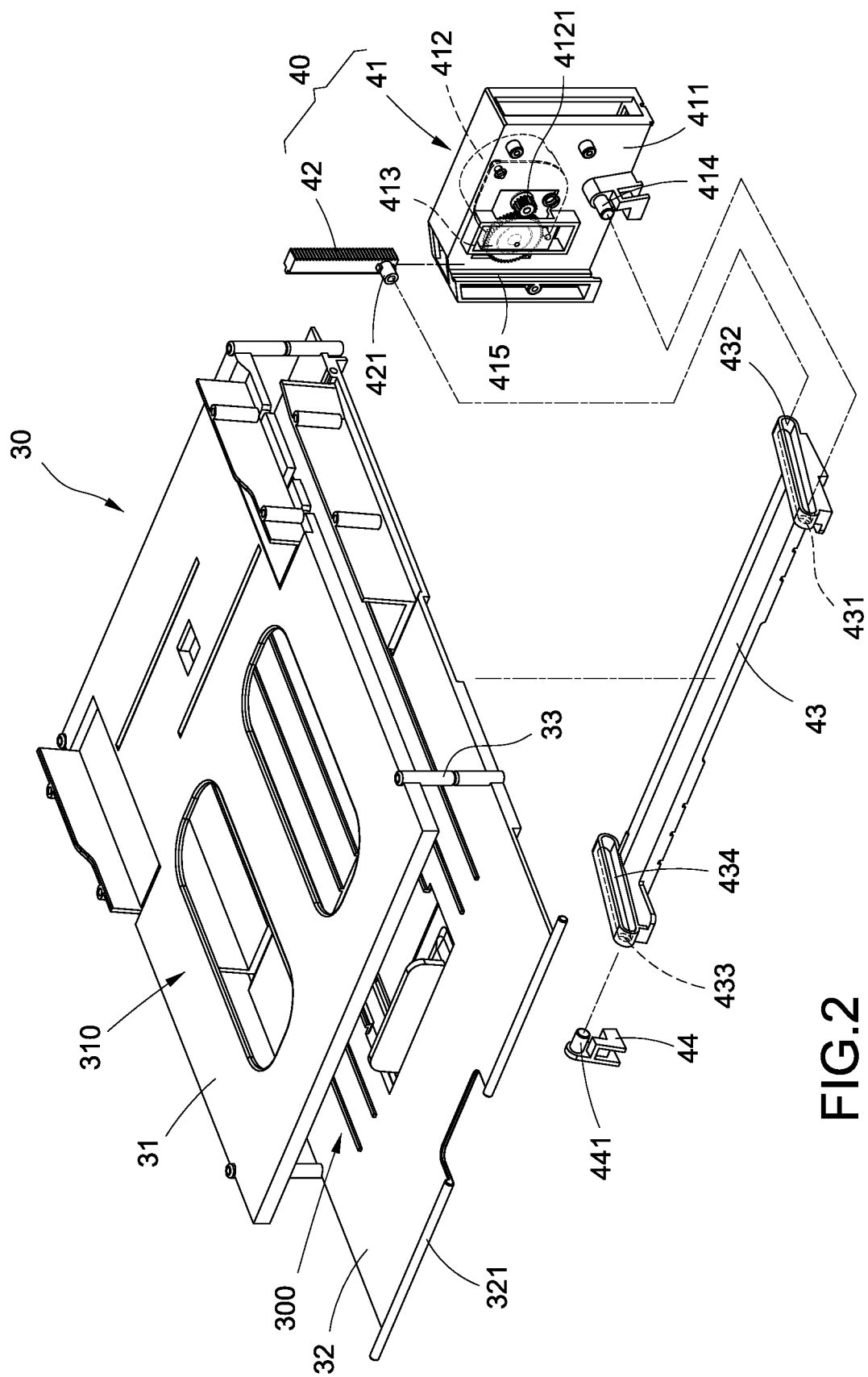
FIG. 2 is a perspective exploded view of the paper cassette and the cassette power module of this disclosure.
Figure 3:
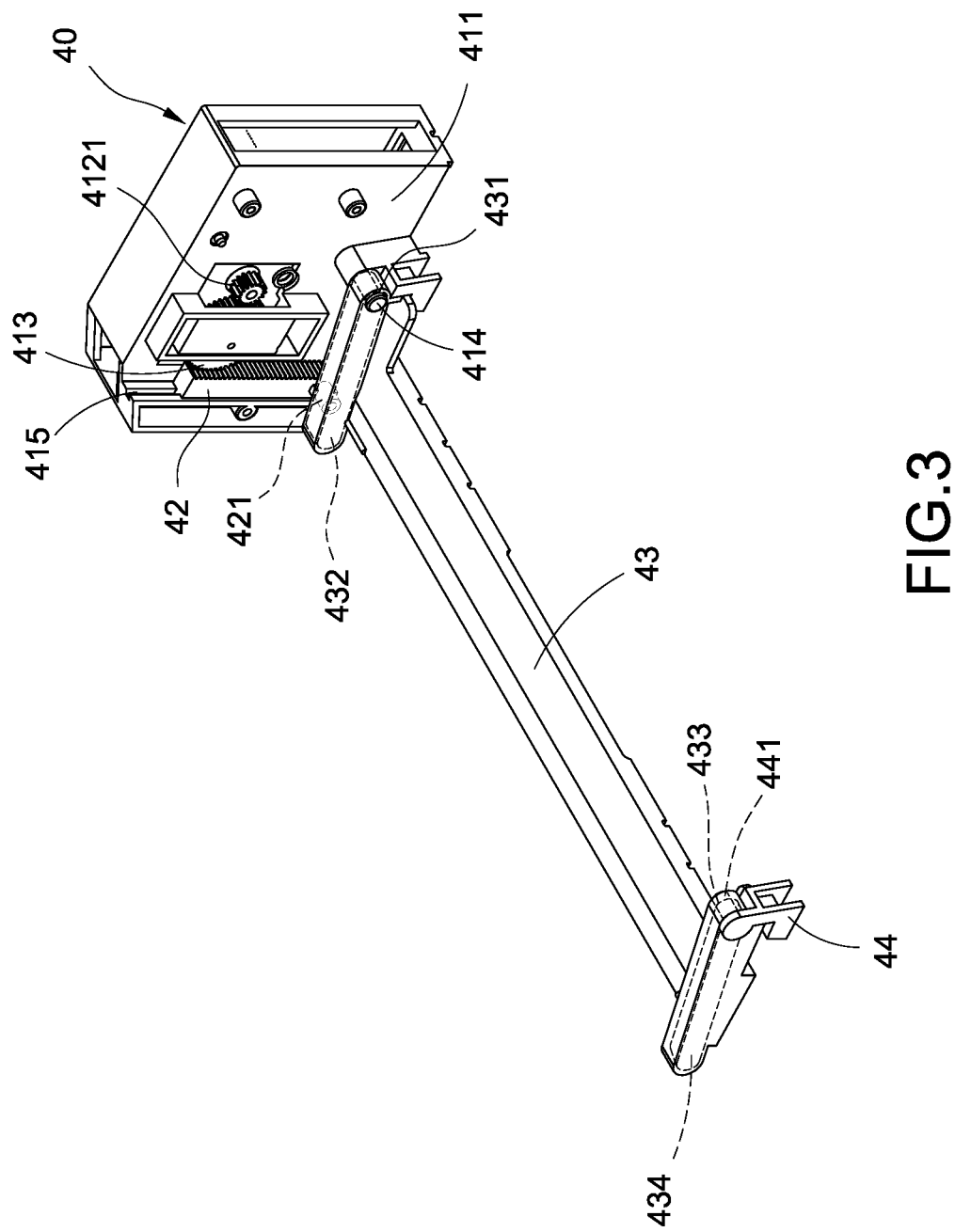
FIG. 3 is a perspective schematic view of the assembly of the supporting plate and the cassette power module of this disclosure.
Figure 4:
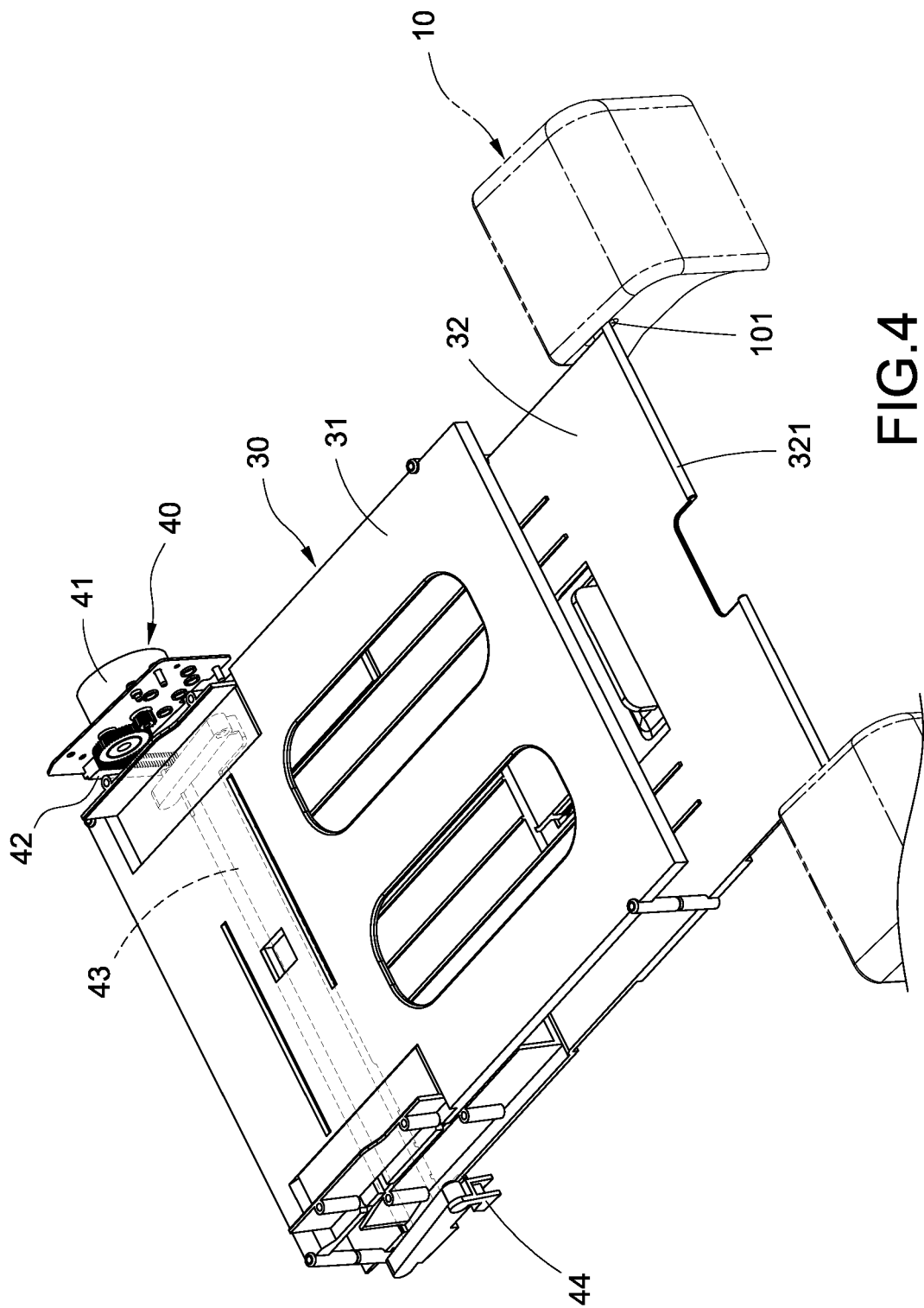
FIG. 4 is a perspective schematic view of the assembly of the paper cassette and the cassette power module of this disclosure.

Please further refer to FIG. 2 to FIG. 4, they depict a perspective exploded view of the paper cassette and the cassette power module of this disclosure, a perspective schematic view of the assembly of the supporting plate and the cassette power module of this disclosure and a perspective schematic view of the assembly of the paper cassette and the cassette power module of this disclosure. As shown in FIG. 2, the paper cassette 30 includes an upper paper tray 31 and a lower paper tray 32 arranged spacedly. The upper paper tray 31 includes an upper paper space 310 and is arranged on the side of the paper cassette 30 away from the flatbed scanner 10 (refer to FIG. 1). Additionally, a lower paper space 300 is formed between the upper paper tray 31 and the lower paper tray 32.

In this embodiment, the paper cassette 30 further includes a plurality of supporting pillars 33. The supporting pillars 33 are arranged spacedly on the peripheries of the upper paper tray 31 and the lower paper tray 32. The supporting pillars 33 are connected to each other in pairs to form the lower paper space 300 between the upper paper tray 31 and the lower paper tray 32.

The cassette power module 40 is disposed on one side of the paper cassette 30. The cassette power module 40 includes a motor set 41 and a transmission part 42 connected to the motor set 41. Specifically, the motor set 41 includes a motor fixing part 411, a motor body 412 and a driving gear 413. The motor body 412 and the driving gear 413 are disposed on the motor fixing part 411, and the driving gear 413 is connected to the motor body 412 and the transmission part 42.

In one embodiment of this disclosure, the cassette power module 40 further includes a supporting plate 43 and a supporting seat 44. The supporting plate 43 is connected to the motor fixing part 411, the transmission part 42 and the supporting seat 44. The supporting plate 43 abuts against the bottom side of the lower paper tray 32, and one side of the supporting plate 43 oscillates along with the movement of the transmission part 42 to drive the paper cassette 30.

Specifically, the supporting plate 43 includes a first perforation 431 and a first sliding groove 432 disposed on one end thereof, and includes a second perforation 433 and a second sliding groove 434 disposed on the opposite end thereof. Additionally, the supporting seat 44 includes a second protruding post 441. In this embodiment, the motor fixing part 411 is a housing. The housing includes a first protruding post 414 disposed on a side thereof facing the paper cassette 30. The first protruding post 414 is inserted in the first perforation 431, and the second protruding post 441 is inserted in the second perforation 433. Therefore, two ends of one side of the supporting plate 43 are fixed on the motor fixing part 411 and the supporting seat 44 respectively.

Please refer to FIG. 2 and FIG. 3, the motor body 412 includes a motor gear 4121. The motor gear 4121 meshes with the driving gear 413, and the driving gear 413 meshes with the transmission part 42 (such as a rack or including a rack).

In this embodiment, the transmission part 42 includes a rack, and the rack includes a coupling post 421. The coupling post 421 is inserted in the first sliding groove 432 and may move in the first sliding groove 432. Additionally, the motor fixing part 411 includes a rail 415 on the position corresponding to the transmission part 42. The transmission part 42 may move along the rail 415 and is movably coupled to the motor fixing part 411. Thus, the transmission part 42 is movably disposed on one side of the paper cassette 30.

Therefore, when the transmission part 42 (rack) moves along the track 415 up and down, one side of the supporting plate 43 rotates around the first protruding post 414 and the second protruding post 441 as the center points. Moreover, the opposite side of the supporting plate 43 may be oscillated.

Please refer to FIG. 4, in the embodiment, the supporting plate 43 abuts against one side of the lower paper tray 32. Furthermore, the lower paper tray 32 includes a rotating shaft 321 on the side thereof away from the cassette power module 40, and the rotating shaft 321 is disposed on the flatbed scanner 10. In this embodiment, the flatbed scanner 10 includes a shaft hole 101, and the rotating shaft 321 is inserted in the shaft hole 101.

Furthermore, when the motor set 41 drives the transmission part 42 to move up and down linearly, one side of the supporting plate 43 oscillates to push the paper cassette 30. Then, the paper cassette 30 oscillates around the rotating shaft 321 of the lower paper tray 32 as the center point.

Figure 5:
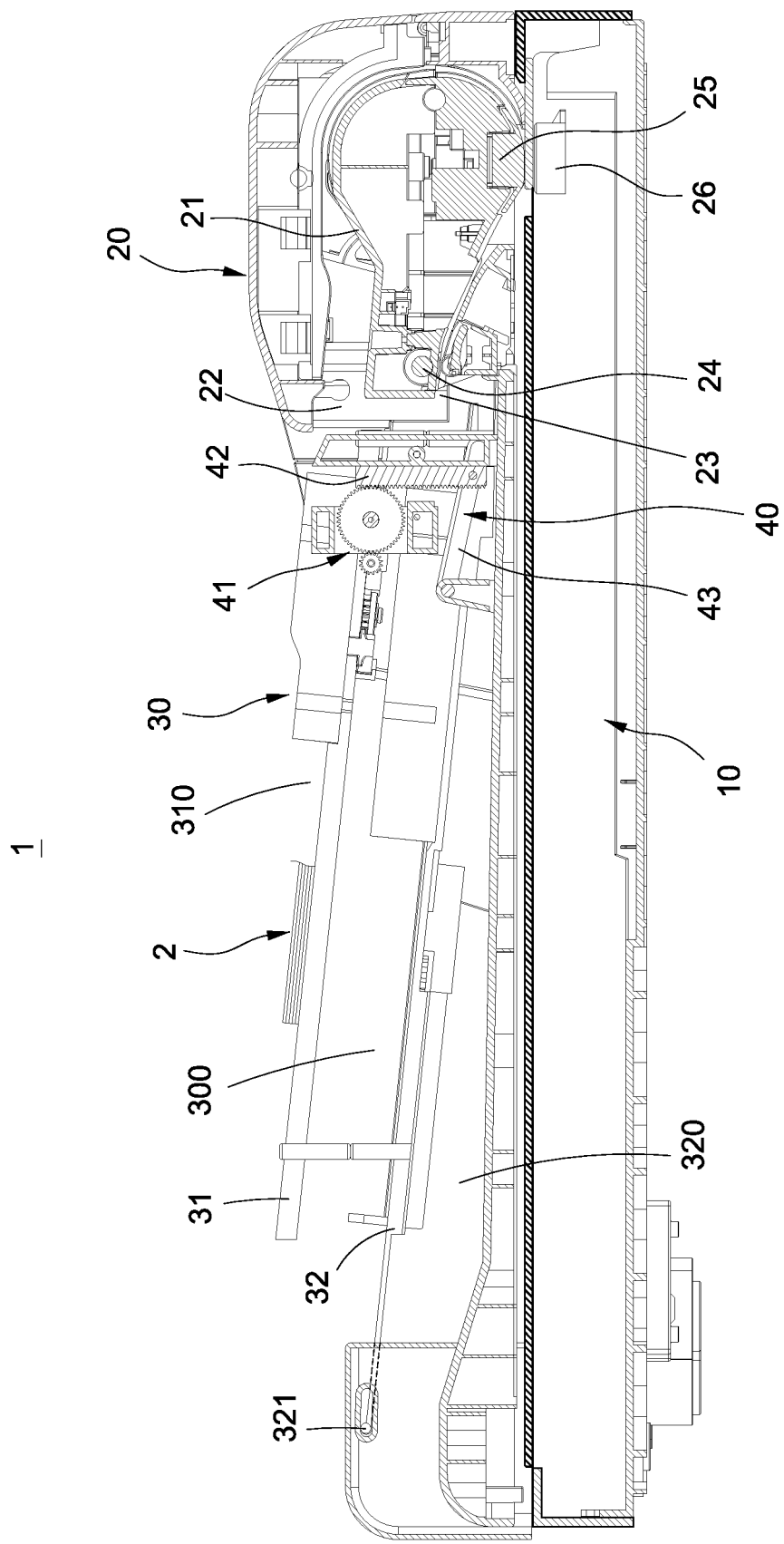
FIG. 5 is a cross sectional view of the duplex scanning device of this disclosure.
Figure 6:
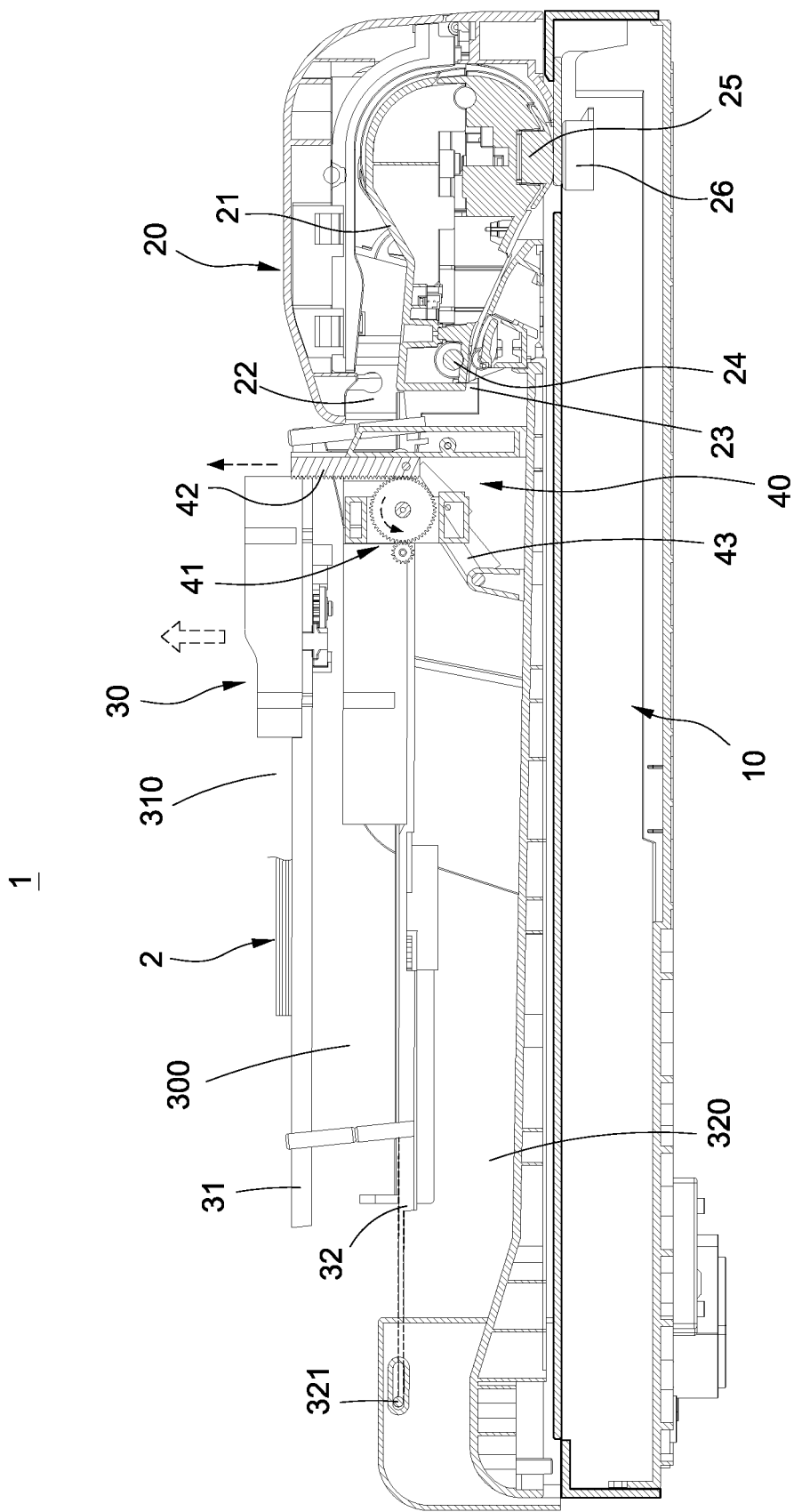
FIG. 6 is an operation schematic view of the duplex scanning device of this disclosure.

Please further refer to FIG. 5 and FIG. 6, which depict a cross sectional view of the duplex scanning device and an operation schematic view of the duplex scanning device of this disclosure. The automatic document feeder 20 is combined on the flatbed scanner 10. The automatic document feeder 20 includes a paper feeder body 21, a paper inlet 22 and a paper outlet 23. The paper inlet 22 and the paper outlet 23 are located on an upper side and a lower side of the paper feeder body 21 respectively. Additionally, the paper cassette 30 is disposed on one side of the paper feeder body 21 and adjacent to the paper inlet 22 and the paper outlet 23. The cassette power module 40 includes a motor set 41 and a transmission part 42. The motor set 41 is arranged on one side of the paper cassette 30 and is capable of driving the paper cassette 30. Therefore, the transmission part 42 drives the paper cassette 30 to move on one side of the automatic document feeder 20 under the driving of the motor set 41 to control the upper paper tray 31 or the lower paper tray 32 to connect with the paper inlet 22.

In the embodiment, the automatic document feeder 20 further includes a paper output roller 24, a paper weight 25 and an image sensor 26. The paper output roller 24 is disposed on the paper outlet 23. The paper weight 25 is disposed on the paper feeder body 21 by the side attached to the flatbed scanner 10. The image sensor 26 is arranged inside the flatbed scanner 10 and disposed corresponding to the position of the paper weight 25.

Please refer to FIG. 5, when the duplex scanning device 1 of this disclosure is used, the document 2 to be scanned is placed on the upper paper tray 31 (upper paper space 310) with the first side facing up, and the upper paper tray 31 is connected with the paper inlet 22.

When the double-sided scanning is performed, the document 2 enters the scanning path of the paper feeder body 21 from the paper inlet 22 and passes the paper weight 25, and the image sensor 26 performs scanning on the first side of the document 2. Then, the document 2 is sent out through the paper outlet 23 after the scanning of the first side is finished. At this time, the document 2 is placed on the lower paper tray 32 (in the lower paper space 300) with the first side facing down.

After the scanning of the first side of the document 2 is completed, the cassette power module 40 then drives the paper cassette 30 to move. As a result, the lower paper tray 32 is connected with the paper feed inlet 22. Then, the document 2 is placed on the lower paper tray 32 with the second side facing up. The document 2 enters the scanning path of the paper feeder body 21 from the paper inlet 22 to scan the second side of the document 2. The document 2 is sent out to the fixed paper space 320 (the top surface of the flatbed scanner 10) through the paper outlet 23 after the scanning of the second side is finished. At the same time, the document 2 is placed on the fixed paper space 320 with the first side facing up. That is, the document 2 returns to the status of being placed with the first side facing up when the double-sided scanning is completed.

Accordingly, the duplex scanning device 1 of this disclosure includes only one image sensor 26 to perform the double-sided scanning of the document 2. Thus, the overall cost of the duplex scanning device 1 may be reduced. Moreover, as the double-sided scanning of the document 2 is completed only by two-pass duplex scanning, the scanning time is reduced to improve the efficiency of use, and the practicality of this disclosure is increased.

While this disclosure has been described by means of specific embodiments, numerous modifications and variations could be made thereto by those skilled in the art without departing from the scope and spirit of this disclosure set forth in the claims.

What is claimed is:

1. A duplex scanning device, comprising:
    a flatbed scanner;
    an automatic document feeder, combined on the flatbed scanner and comprising a paper feeder body, a paper inlet and a paper outlet, and the paper inlet and the paper outlet located on an upper side and a lower side of the paper feeder body respectively;
    a paper cassette, disposed on one side of the paper feeder body and adjacent to the paper inlet and the paper outlet, and comprising an upper paper tray and a lower paper tray arranged spacedly; and
    a cassette power module, disposed on one side of the paper cassette and comprising a motor set and a transmission part connected to the motor set, and the transmission part connected with the paper cassette;
    wherein, the transmission part drives the paper cassette to move on one side of the automatic document feeder under a driving of the motor set to control the lower paper tray to connect with the paper inlet or the paper outlet.

2. The duplex scanning device according to claim 1, wherein the lower paper tray comprises a rotating shaft on a side thereof away from the cassette power module, and the rotating shaft is disposed on the flatbed scanner.

3. The duplex scanning device according to claim 1, wherein the paper cassette further comprises a plurality of supporting pillars arranged spacedly on peripheries of the upper paper tray and the lower paper tray, and the supporting pillars are connected to each other in pairs to configure a lower paper space between the upper paper tray and the lower paper tray.

4. The duplex scanning device according to claim 1, wherein the upper paper tray is arranged on a side of the paper cassette away from the flatbed scanner and comprises an upper paper space; and
    a fixed paper space is disposed between the lower paper tray and the flatbed scanner.

5. The duplex scanning device according to claim 4, wherein the motor set comprises a motor fixing part, a motor body and a driving gear, the motor body and the driving gear disposed on the motor fixing part, and the driving gear is connected to the motor body and the transmission part.

6. The duplex scanning device according to claim 5, wherein the transmission part comprises a rack, and the motor fixing part comprises a rail, and the transmission part moves along the rail and is movably coupled to the motor fixing part.

7. The duplex scanning device according to claim 6, wherein the cassette power module further comprises a supporting plate connected to the motor fixing part and disposed on a bottom side of the lower paper tray.

8. The duplex scanning device according to claim 7, wherein the motor fixing part comprises a housing, and the housing comprises a first protruding post disposed on a side thereof facing the paper cassette; and
    the supporting plate comprises a first perforation disposed on one end thereof, and the first protruding post is inserted in the first perforation.

9. The duplex scanning device according to claim 8, wherein the rack comprises a coupling post; and
    the supporting plate comprises a first sliding groove, and the coupling post is inserted in the first sliding groove.

10. The duplex scanning device according to claim 8, wherein the cassette power module further comprises a supporting seat, and the supporting seat comprises a second protruding post; and
    the supporting plate comprises a second perforation located on another end thereof corresponding to the first perforation, and the second protruding post is inserted in the second perforation.

\* \* \* \* \*